United States Patent [19]

Ziner

[11] 4,309,789
[45] Jan. 12, 1982

[54] SELF-DEICING WINDSHIELD WIPER

[76] Inventor: Erwin N. Ziner, 262 Pelham Island Rd., Wayland, Mass. 01778

[21] Appl. No.: 186,140

[22] Filed: Sep. 11, 1980

[51] Int. Cl.³ .............................................. B60S 1/04
[52] U.S. Cl. .............................. 15/250.36; 15/250.38
[58] Field of Search .......... 15/250.04, 250.05, 250.36, 15/250.2, 250.38, 250.39

[56] References Cited

U.S. PATENT DOCUMENTS

| | | | |
|---|---|---|---|
| 3,048,872 | 8/1962 | Kerrigan | 15/250.36 |
| 3,371,368 | 3/1968 | Walker | 15/250.36 X |
| 3,418,676 | 12/1968 | Byezkowski et al. | 15/250.04 |
| 3,431,577 | 3/1969 | Minsky | 15/250.04 |
| 4,208,758 | 6/1980 | Timmis et al. | 15/250.36 |

Primary Examiner—Peter Feldman
Attorney, Agent, or Firm—Kenway & Jenney

[57] ABSTRACT

A self-deicing automotive windshield wiper system comprises a flexible wiper blade conforming to the contour of the windshield, with an expansible air-tight internal cavity extending along essentially the entire length thereof. The flexible outer walls of the wiper blade abut the internal cavity and are influenced by expansion of the cavity. An air fitting, mounted to the outside of the wiper blade communicates with the cavity. A flexible tubing connected to the fitting joins the wiper blade cavity to a pump or compressor producing a pulsating compressed air output. The pulsating air supply causes the expansible cavity to alternately expand and contract, and the pulsations are transferred to the flexible outer walls, causing them to expand and contract in unison. The flexing of the outer walls shatters any accumulations of ice clinging to the outer walls.

2 Claims, 4 Drawing Figures

SELF-DEICING WINDSHIELD WIPER

BACKGROUND OF THE INVENTION

The present invention relates generally to automotive windshield wipers and more particularly to a system for removing accumulated ice deposits therefrom.

The effectiveness of a windshield wiper in shedding precipitation from a windshield is severely limited by ice or snow build-up on the flexible rubber blade which sweeps across the glass surface. Gradually, the ice works its way between the cleaning edge of the blade and the windshield and, if its spread remains unchecked, the blade eventually loses all direct contact with the windshield. This totally neutralizes the squeegee cleaning action of the blade. In the midst of a raging blizzard, such a condition can pose dual safety hazards: severely restricted visibility, and a recurring need to stop the automobile in unfavorable conditions to chip away manually the build-up. Vibrations and stresses induced by the normal oscillatory wiping motion of the blade are usually insufficient to check the bothersome accumulations.

There are schemes known to the prior art for deicing windshield wipers or the adjacent windshield surface. The disclosure of U.S. Pat. No. 3,058,141, which is addressed generally to the problem of maintaining proper contact of a wiper blade with a curved windshield surface, alludes to the possibility of a defrosting action occuring due to the escape of air through nozzle openings in the wiper blade element. U.S. Pat. No. 3,371,368, also disclosing a structure for forcing a blade more securely against a windshield, shows holes on the outer surface of the blade which communicate with a hollow channel inside the blade to allow application of warm air against the windshield. However, although this warm air may be useful in deicing the windshield, there is no indication that it is effective in preventing ice build-ups on the blade itself.

Therefore, it is an object of the present invention to remove ice build-ups on the exterior of windshield wiper assemblies, even during operation thereof, and to do so in a simple, reliable and efficient manner.

It is a further object of the present invention to provide such a system, which can be adapted readily and economically to presently existing windshield wiper structures.

SUMMARY OF THE INVENTION

A self-deicing windshield wiper system in accordance with the present invention comprises a wiper blade having flexible outer walls which abut a fluid-tight expansible internal cavity extending along the length of the blade. Means for generating a pulsating fluid output is provided, as well as a conduit for introducing the reciprocating fluid output into the fluid-tight cavity of the blade. The volume of the reciprocating fluid output is sufficiently large to produce pulsations of the internal cavity which, in turn, rhythmically flex the outer walls of the blade. The resulting expansion and contraction of the outer walls are effective in shattering an accumulated sheath of ice and causing it to slough off.

In a particular embodiment of the present invention, a battery operated, reciprocating electric pump is mounted under the hood of the automobile, powered by the 12-volt battery which serves as the main electrical power source of the automobile. A flexible rubber tubing connects the output of the pump to a serrated male fitting, which is attached to the outside of the wiper blade and protrudes into the internal cavity. Upon activation by the operator of a starter switch located on the instrument panel, the pump delivers a pulsating, or reciprocating, output of compressed air to the sealed cavity.

BRIEF DESCRIPTION OF THE DRAWINGS

The specific embodiment of the present invention will be described in detail with reference to the various views of the drawing in which.

DESCRIPTION OF THE PREFERRED EMBODIMENT

Figure 1:
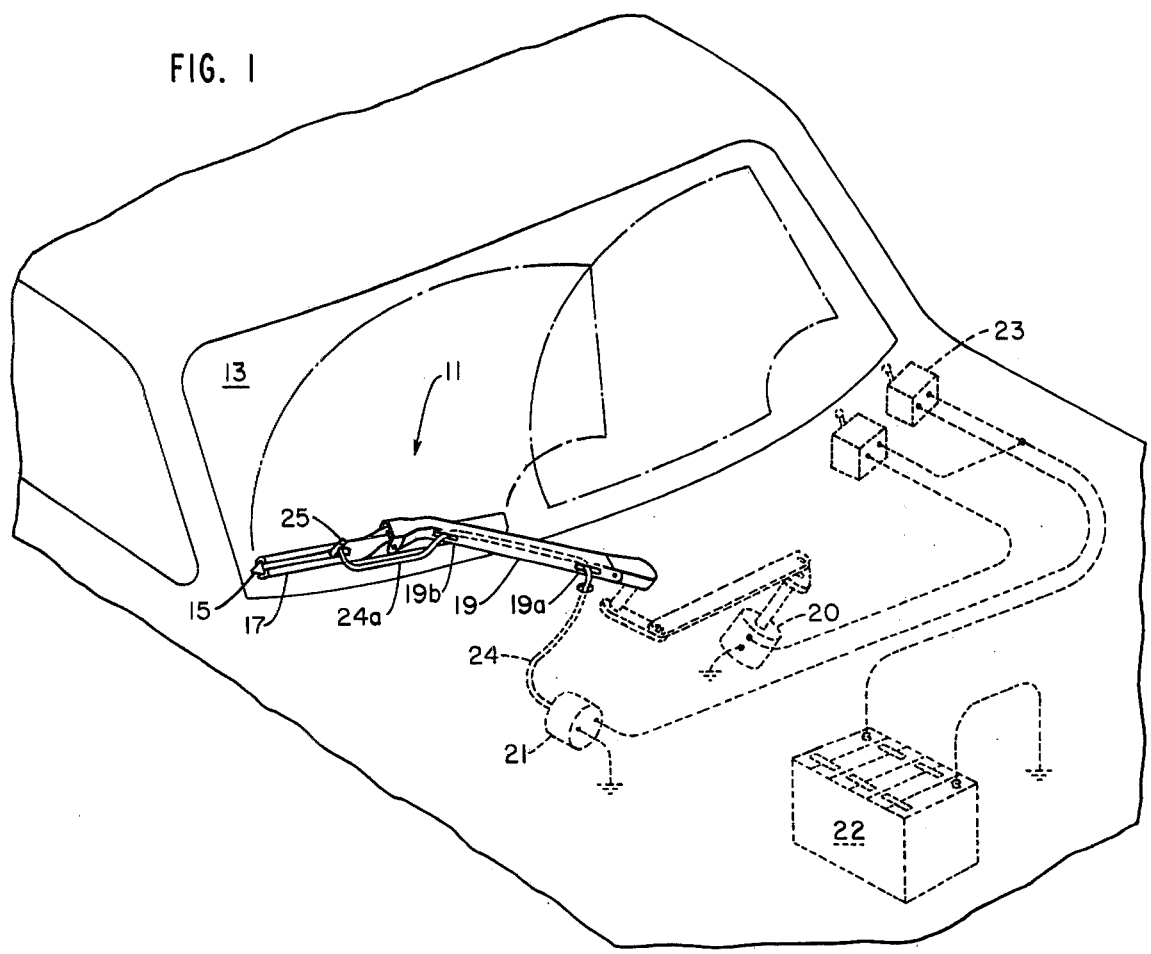
FIG. 1 is a perspective view, in diagrammatic form, showing a self-deicing windshield wiper system in accordance with the present invention.

Referring to FIG. 1, a windshield wiper assembly 11 rests in a normal operating position against the glass surface of an automobile windshield 13. A flexible wiper blade 15, which acts as a squeegee on the glass surface, is supported within a metal framework 17. The framework 17 maintains the blade at the proper attitude relative to the windshield, and causes the blade to assume the proper contour to function most efficiently. The metal framework 17 also may have built into it various tensioning mechanisms to hold the blade 15 firmly against the windshield, even in the face of countervailing winds generated at high speeds of the automobile.

A sweep arm 19, pivotably attached at its upper end to the framework 17, is connected at its lower end to a conventional drive motor 20. The motor 20 oscillates the arm through an arc so as to sweep the blade 17 periodically across the surface of the windshield, to wipe precipitation therefrom. A source of pulsating or reciprocating compressed air, shown here as an electric pump 21 powered by a standard 12-volt automobile battery 22, is mounted at a convenient location within the engine compartment of the automobile. A selector switch 23, positioned on the instrument panel (not shown) and accessible to the driver, controls the application of the battery's power to the pump 21.

It is noted that although an electrically operated pump 21 is shown, the source of pulsations may take any one of several alternative forms. It may be a compressor rather than a pump. It may be belt driven by connection directly or indirectly to the crankshaft of the engine, rather than electrically driven. It may also be adapted for creating pulsations in a gas other than air or a liquid which fills the sealed system, and through which the pulsations may be communicated to the interior of the wiper blade or blades.

A flexible tubing or rubber hose 24 connected to the output of the pump 21 passes through the body of the car adjacent the sweep arm 19. Preferably the sweep are 19 has a hollow interior or a longitudinal channel to accept and guide the tubing 24. The tubing enters the sweep arm near its bottom end 19a and proceeds therealong, exiting near the top end 19b. The support provided to the tubing by the sweep arm 19 prevents undesirable flexing or kinking of the tubing which leads to wear and premature deterioration. The top end 24a of the flexible tubing is pressfit onto an outwardly protruding serrated end 25a (see FIG. 2) of a fitting 25 mounted to the outer surface of the wiper blade 15. When the selector switch 23 is turned to the "ON" position, the pulsating air output of the pump is supplied via the tubing 24 to the interior of the blade 25, to effect deicing of the blade in a manner hereinafter described in greater detail.

Figure 2:
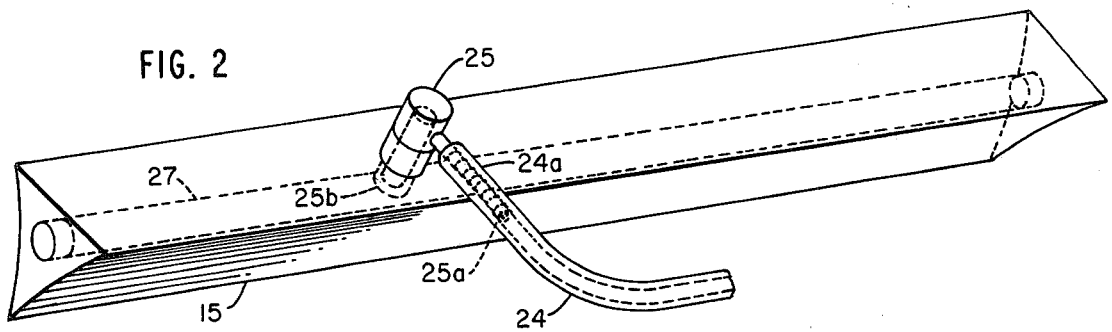
FIG. 2 is a detailed perspective view of the structure of the windshield wiper blade.

As sown in FIG. 2, an inner end 25b of the hollow male fitting 25 protrudes into the interior of the wiper blade 15 and communicates with a longitudinal sealed cavity 27 which extends along almost the entire length of the wiper blade 15. The interface between the fitting 25 and the wiper blade 15 is sealed, by any conventional means, to insure a durable airtight connection therebetween. The cavity 27 is integrally formed within the flexible material such as, for example, natural or synthetic rubber, which constitutes the flexible wiper blade. The cavity 27 is airtight, which insures that air is unable to either escape from, or enter into, the internal cavity except through the access provided by the fitting 25.

Figure 3A:
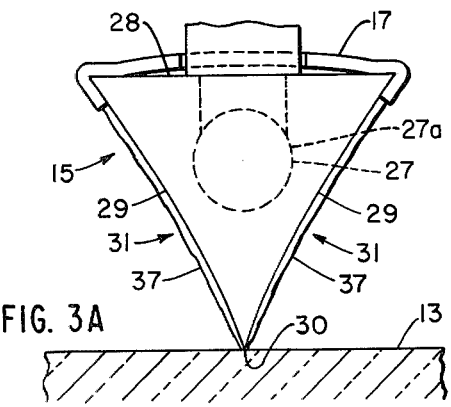
FIGS. 3A and 3B are end views of the wiper blade of FIG. 2 showing the blade walls in a contracted and expanded state respectively.

Referring to FIG. 3A, the cavity 27 serves to define three wall portions of the wiper blade 15, a top wall 28, and two sidewalls 29 sharing a common bottom edge 30, which edge rides against the windshield 13. The triangularly shaped blade 15 is shown at rest in FIG. 3A, with the walls 29 forming equal acute angles with the surface of the windshield 13. The sidewalls 29 are sufficiently thin that changes in the size of the internal cavity 27 alter the outer countours of the two sidewalls. When the internal cavity is in a relaxed, unexpanded state, i.e. at normal atmospheric pressure, the side walls 29 assume slightly concave contours as at 31.

Figure 3B:
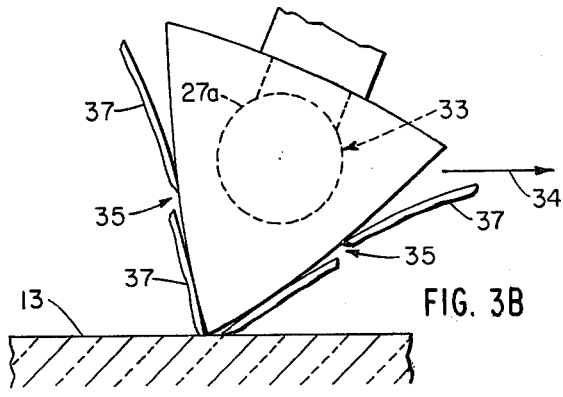

Upon activation of the pump 21, pulsating compressed air is supplied through the tubing 24 and the fitting 25 into the cavity 27. The volume of air provided by each positive pulse of the pump is preferably larger than the internal volume of the cavity 27 when at atmospheric pressure. Because of the air-tight nature of the cavity, the increased volume of air inflates the cavity, forcing an enclosing surface 27a outwardly. Referring to FIG. 3B, the cavity assumes a larger volume, as indicated by reference numeral 33.

When in motion, the sidewalls 29 are at different inclinations relative to the windshield, the wiper blade moving in the direction indicated by an arrow 34 in FIG. 3B. Upon an increase in pressure the sidewalls expand from their original concave contours to assume distended, convex contours as at 35. A rigid, brittle layer of ice 37, formed on the outer surface of the sidewalls 29, is shattered by the outward expansion of the sidewalls 29 and sloughs off. During a negative reciprocation of the pump 21, the volume of air within the cavity will decrease, and the cavity 27 and sidewalls 29 will contract to assume their original configurations (see FIG. 3A).

For particularly heavy ice build-ups, a prolonged series of rhythmic expansions and contractions of the sidewalls 29 may be necessary to fracture adequately the ice layer and effect complete removal.

Although the invention has been described with reference to its preferred embodiment, certain variations and modifications may be obvious to those skilled in the art, and it is intended that such variations and modifications fall within the scope of the appended claims. For example, an expansible airtight sac could be included within the cavity to receive the pulsating air supply, or alternatively, a fluid other than air could be used as the inflating medium. Also, the shape of the wiper blade could be changed from the triangular shape depicted herein without departing from the spirit of the present invention.

What is claimed and desired to be secured by Letters Patent is:

1. A self-deicing windshield wiper system, comprising:

a wiper blade having flexible outer walls abutting a fluid-tight, expansible internal cavity extending along the length of said blade;

means for generating a pulsating fluid output, and conduit means for connecting the fluid output to said fluid-tight cavity, the volume per pulse of said pulsating fluid output being sufficiently large to cause the pulsations of said internal cavity to flex rhythmically said outer walls.

2. A self-deicing windshield wiper system, comprising:

a wiper blade having flexible outer walls abutting an air-tight, expansible internal cavity extending along the length of said blade;

a hose fitting attached to the exterior of said blade and communicating with said internal cavity;

an electric air pump having a pulsating output of compressed air; and a flexible hose joining the output of said air pump to said fitting, the volume per pulse of said pulsating compressed air output being sufficiently large to cause the pulsations of said internal cavity to flex rhythmically said outer walls.

* * * * *